Figure 7:
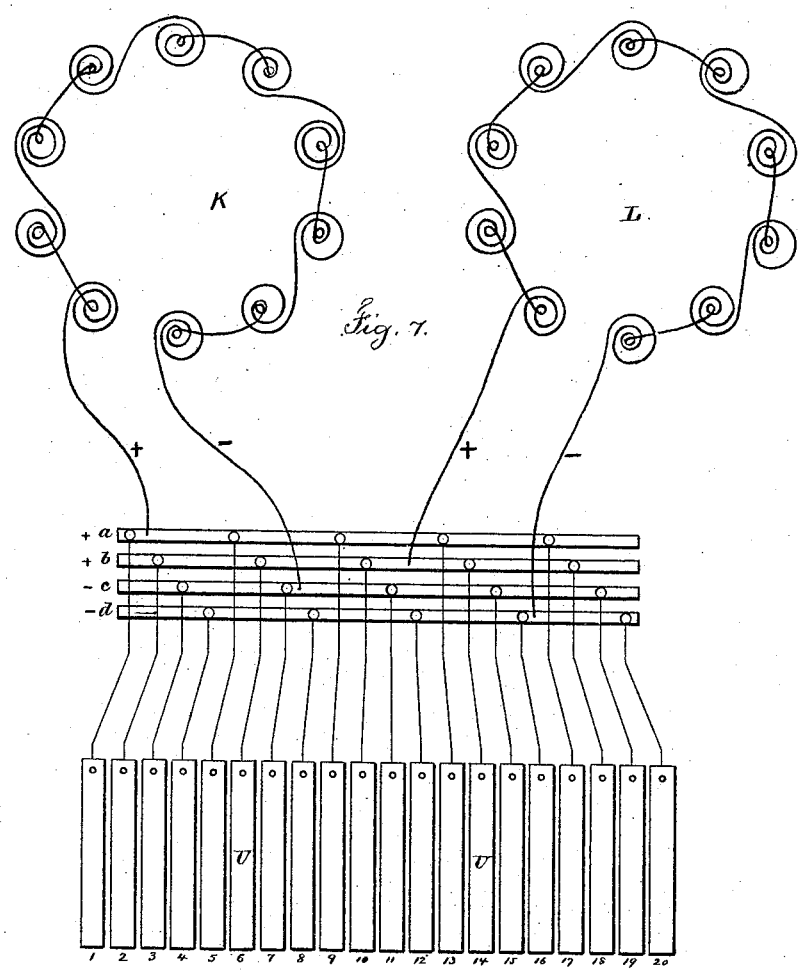

(No Model.)
5 Sheets—Sheet 1.
C. M. BALL.
DYNAMO ELECTRIC MACHINE.
No. 294,719. Patented Mar. 4, 1884.
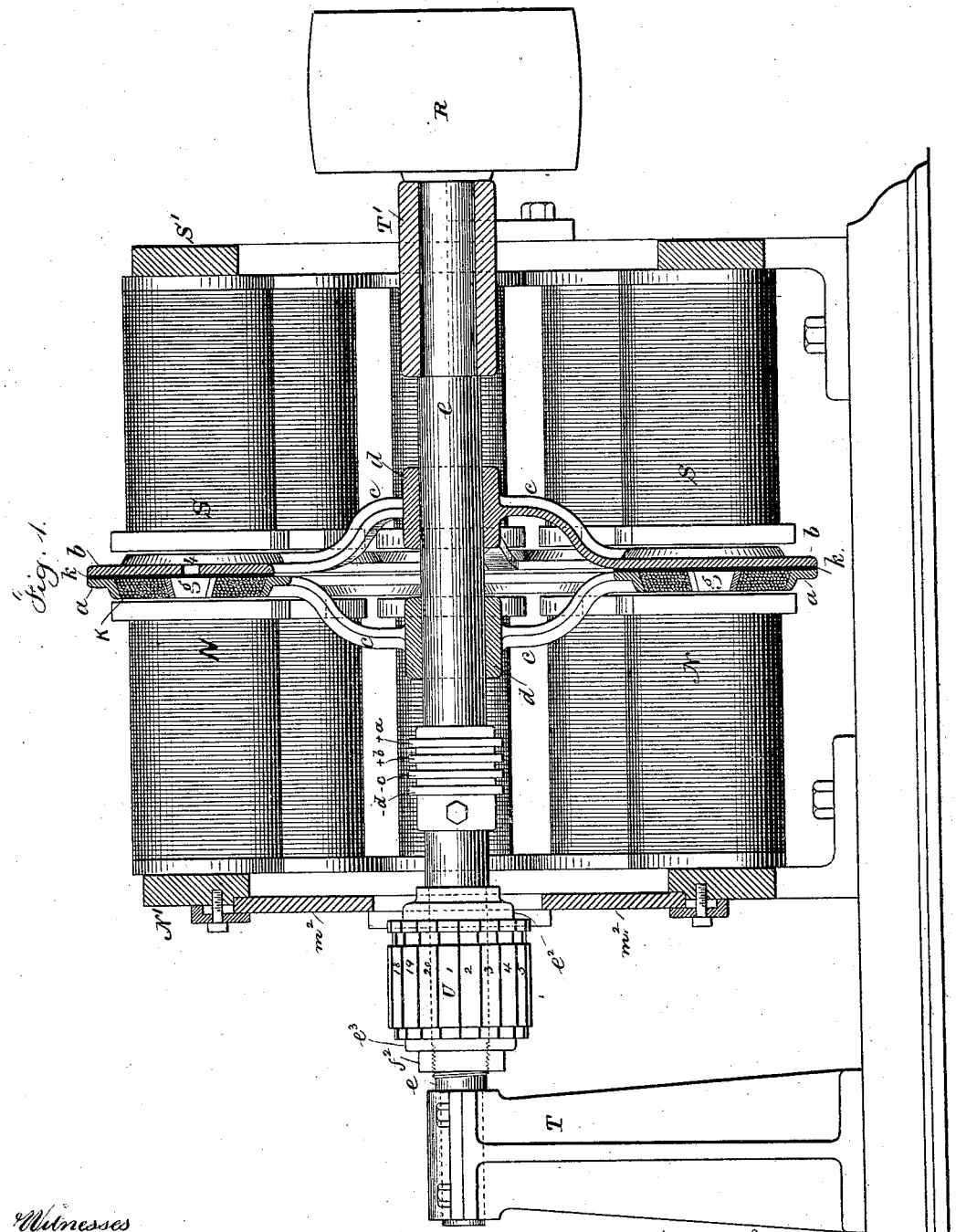
Witnesses
Chas. H. Smith
J. Staib
Inventor
Clinton M. Ball
for Lemuel W. Serrell atty
N. PETERS, Photo-Lithographer, Washington, D. C.

(No Model.)  5 Sheets—Sheet 2.
C. M. BALL.
DYNAMO ELECTRIC MACHINE.
No. 294,719.  Patented Mar. 4, 1884.
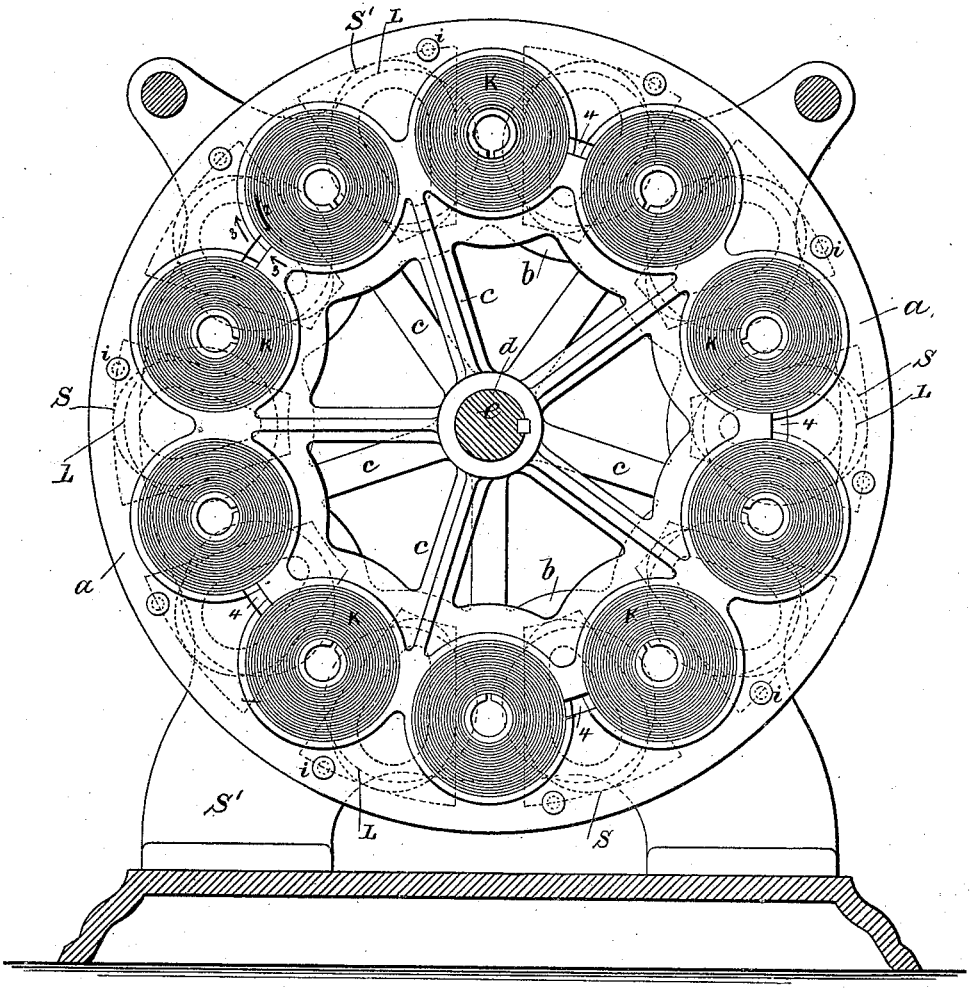
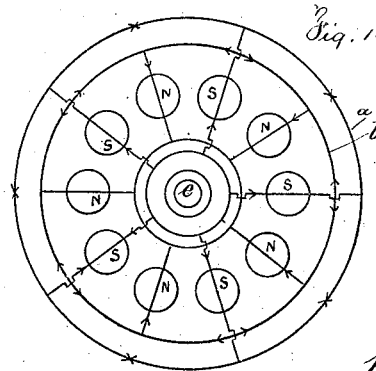
Witnesses
Chas. H. Smith
J. Stauf
Inventor
Clinton M. Ball
per Lemuel W. Serrell
Atty (No Model.)  5 Sheets—Sheet 3.
C. M. BALL.
DYNAMO ELECTRIC MACHINE.
No. 294,719.  Patented Mar. 4, 1884.
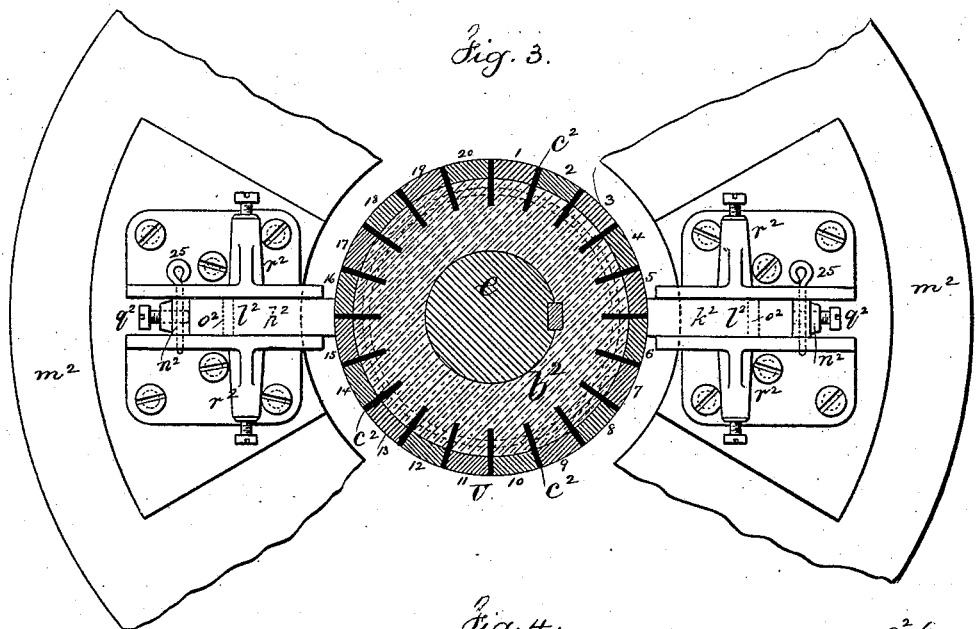
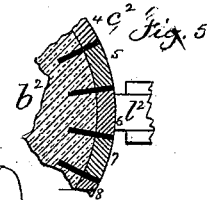
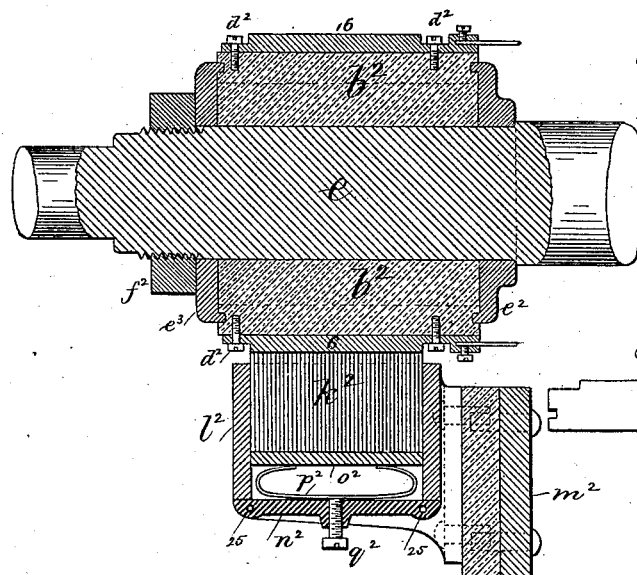
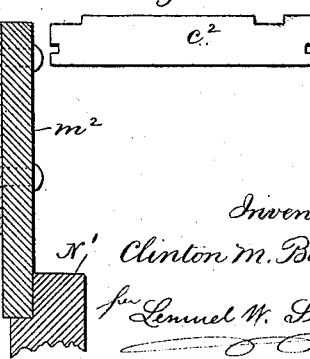
Witnesses
Chas. H. Smith
J. Stail
Inventor
Clinton M. Ball
per Lemuel W. Serrell
att (No Model.)  5 Sheets—Sheet 4.

C. M. BALL.
DYNAMO ELECTRIC MACHINE.

No. 294,719.  Patented Mar. 4, 1884.

Witnesses  Inventor
Chas H Smith  Clinton M. Ball
J. Stark  per Lemuel W. Serrell
  Atty (No Model.) 5 Sheets—Sheet 5.
C. M. BALL.
DYNAMO ELECTRIC MACHINE.
No. 294,719. Patented Mar. 4, 1884.
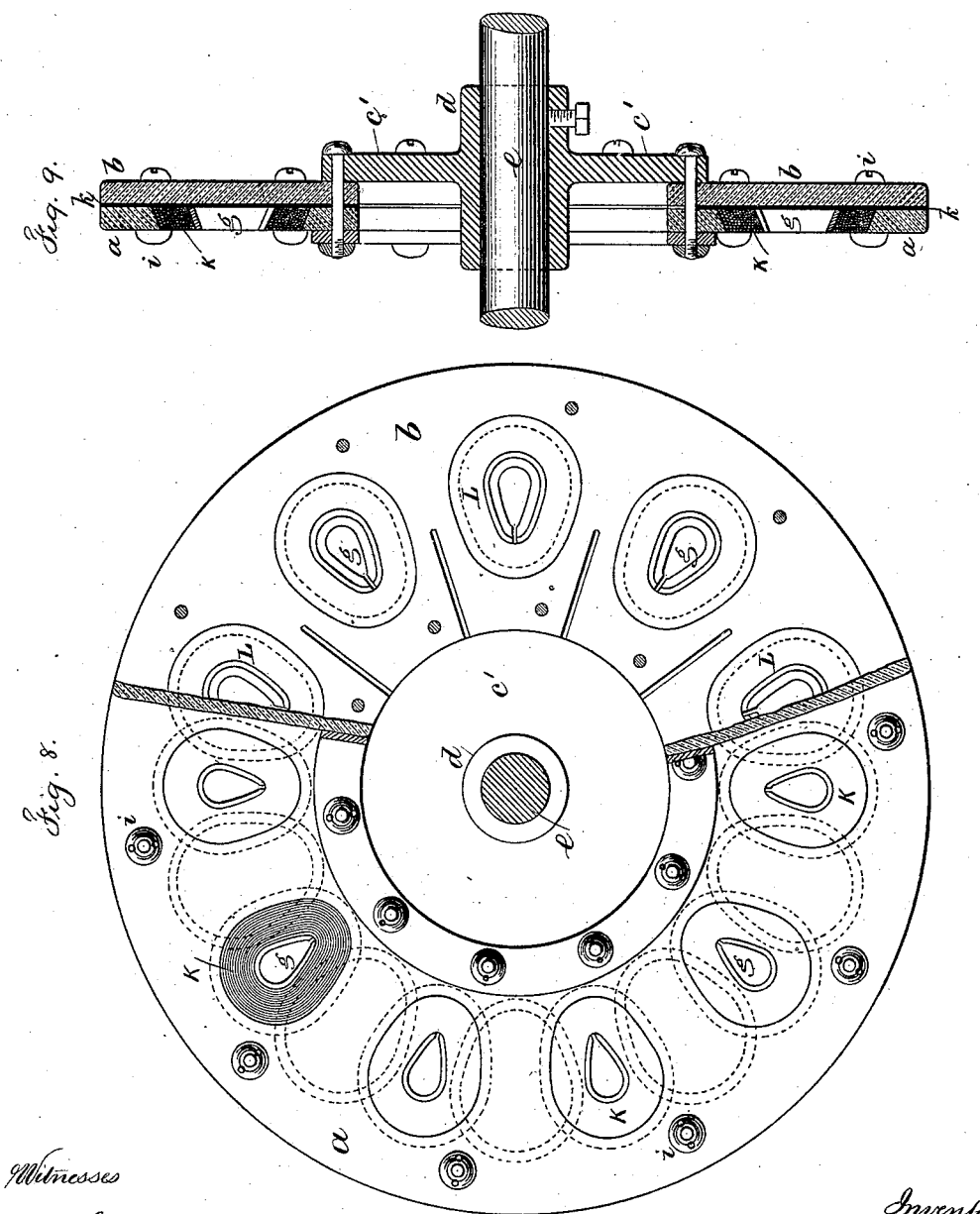
Witnesses
Chas H Smith
J. Staib
Inventor
Clinton M. Ball
for Lemuel W. Serrell
Atty

UNITED STATES PATENT OFFICE.

CLINTON M. BALL, OF TROY, ASSIGNOR OF TWO-THIRDS TO JOHN McKENZIE, OF WEST TROY, AND JOSEPH A. POWERS, OF LANSINGBURG, N. Y.

DYNAMO-ELECTRIC MACHINE.

SPECIFICATION forming part of Letters Patent No. 294,719, dated March 4, 1884.

Application filed May 29, 1883. (No model.)

*To all whom it may concern:*

Be it known that I, CLINTON M. BALL, of Troy, in the county of Rensselaer and State of New York, have invented an Improvement in Dynamo-Electric Machines, of which the following is a specification.

I make use of a revolving armature disk or wheel having recesses that receive the induction coils or helices, such recesses being of an interior shape corresponding to the shape of the coil, and tapered or larger at the inner part of the disk than at the outer part, so as to retain the coils within the disks. Two disks, setting back to back, are placed so that the coils alternate in position, and the connections are taken off to commutator-bars peculiarly constructed; and I use collectors or rubbers in place of brushes, such collectors being in the form of contact-plates having concave ends to fit the commutator-cylinder, and of a size slightly less than the width of the commutator-plates, so as to rest upon one of such plates before leaving the other, thereby taking off a continuous and nearly uniform current and avoiding sparks.

In the drawings, Figure 1 is a section of the machine transversely of the armature-wheel. Fig. 2 is an elevation of the said armature-wheel. Fig. 3 is a cross-section of the commutator in larger size. Fig. 4 is a longitudinal section of the same. Fig. 5 is a detached view of part of commutator and collector. Fig. 6 shows one of the commutator-divisions. Fig. 7 is a diagrammatic view of the connections of the coils to the commutator. Fig. 8 represents a modification in the armature-disk. Fig. 9 is a cross-section of the same, and Fig. 10 is a diagrammatic representation of the armature-disk and circuits.

The armature-wheel is composed of the disks or flat rings $a$ $b$, connected by arms $c$, as in Figs. 1 and 2, to the hub $d$ on the shaft $e$, or by a disk or flange, $c'$, as in Fig. 8.

In the armature-disks $a$ $b$ there are openings that are conical or tapered, being largest at their inner faces, so that the coils or helices cannot escape from the openings into which they are received after the two disks or flat rings are bolted or riveted together, as at $i$.

If the openings in the two armature-disks coincide with each other, the coils will be wound of a thickness sufficient to fill the two openings, and largest at the central part, in the form of two truncated cones with their bases placed together, in order that the helices may tightly fill the openings in the disks and be secured by them, such disks being placed over the coils from opposite sides of such coils. I, however, usually prefer to provide separate ranges of coils K L, one range for each disk, and to place the disks so that the coils occupy alternating positions, as shown, in which case the coils in one range will have the current induced therein intermediately to those of the other. The coils are either circular, as seen in Fig. 2, or elliptical, as seen in Fig. 8. In either instance there is to be a sheet of good insulating material—such as vulcanized fiber—introduced at $k$, between the disks and coils. The helices or coils K L are shown as provided with tubular split cores $g$, of a tapering form, which may be of any suitable material, either magnetic or otherwise; but I prefer to use non-magnetic material—such as brass—and to split these cores, as shown, so as to prevent the development of electric currents in such cores as they pass the field-magnets; hence there will not be any development of heat or loss of power.

The disks $a$ $b$ in Fig. 8 are represented as flat rings of insulating material—such as vulcanized or gelatinized fiber—and hence there will not be any electric currents developed in them; but when the disks are made of metal—such as brass—in the form shown in Figs. 1 and 2, it is important to prevent the setting up of electric currents in the disk by induction from the field-magnets or from the circulation of currents in the coils or helices. For this object I construct the armature-wheel having the recessed openings for the induction-coils in number corresponding in each disk to the number of field-magnet poles, but with only one-half that number of arms or spokes connecting the hub and rings through to the peripheral part of the wheel, in the case shown in the drawings there being ten field-poles, ten induction-helices, and five arms in each disk.

According to a well-understood law, a radial conductor occupying the relation to the field-magnets of an arm or spoke of one of the armature-disks, and extending from the hub to the periphery, if it separately formed part of an independent closed circuit, would have induced electric currents set up therein of alternately-opposite directions in the conductor when it had a movement of rotation imparted to it which would carry it across the magnetic fields of alternately-opposite polarity; and if the current in the conductor, when passing across the field of N S, were outwardly toward the periphery, at the next stage, when passing S N, it would be reversed, and the electro-motive force would be from the periphery toward the axis. If, now, the metallic basis or frame-work constituting the two disks which compose the armature-wheel had continuous outward and inward paths for the circulation of such induced currents symmetrical with the whole magnetic field, heating and loss of power would result therefrom. A certain number of the radial members of the disk symmetrical with alternate poles of the field, which are all of one like sign, might, however, be connected together in the central portion about the axis and at the periphery; and if such a system were isolated from and had no returning-circuit through portions of the disk symmetrical with the intermediate poles of the field of the other and opposite sign, no continuous paths for the circulation of currents would exist. The electro-motive forces would always balance each other in such a system when in any position in the magnetic field.

Referring to Fig. 10, in which $a$ and $b$, connected at the axis, correspond to the metallic disks of the armature-wheel, and noting the direction of the arrows which indicate the direction of the electro-motive forces, the point will be made entirely clear. To this end, therefore, it suffices to separate the web of metal between the pairs of helices, as seen at 4 4, and to thoroughly insulate the bolts or rivets from the disks by means of bushes and washers and to insulate the other parts of the machine. It is not necessary to separate all the webs or narrow spaces between the respective coils. Every alternate web may be left whole, because there is not a path or circuit all around either helix when the alternate webs are separated, as shown; and the disks may be in metallic contact with each other through the shaft, because the circuit is not completed at the periphery. By this construction of armature-wheel I am able to obtain great strength and to keep the coils flat and the armature-wheel thin, so that the field-magnets N S may be comparatively near each other, as shown. These field-magnets may be of any desired character. I have shown the same as supported by the frames N' S', and I have shown the shaft $e$ as centrally between the field-magnets, supported by the bearings T T', and provided with a pulley, R, so that it may be driven by suitable power. I remark that the field-helices may be in the circuit of the armature-coils, or they may be otherwise energized, as well known. It is also to be borne in mind that this mode of constructing the armature-wheel is available with any character of circuit-connections. I have, however, shown the helices connected up in series in Fig. 7, the inner end of one helix going to the inner end of the next, and the outer ends being joined to each other, as shown, so that the helices will have alternating currents set up in them as they pass alternating N and S poles, and the currents will flow through the entire circuit of helices, first in one direction and then in the other, upon the well-known principles.

In order to connect the armature-helices to the commutator-plates U, I prefer to employ four insulated distributing-rings, $+a$ $+b$ $-c$ $-d$, and the two ends of the armature-coils are connected to these, as represented, the ends of the coils K going to $+a$ and $-c$, and of L to $+b$ and $-d$. Of course the polarity of these rings alternates as the helices are carried across the field-poles. With ten field-magnets, twenty commutator-plates U will be required, as shown, and they are connected in regular order to the rings, the plates 1, 5, 9, 13, and 17 being connected to $+a$, and 2 6 10 14 18 to $+b$, and so on, as indicated in Fig. 7.

As a substitute for the distributing-rings, a single discontinuous ring of a like number of segments, insulated from each other and from the shaft, may be employed in their stead, to which the free ends of the armature-coils may be attached at one side, and wires leading from each segment at the opposite side to the corresponding commutator-plates, and in the same order as if the distributing-rings $+a$ $+b$ $-c$ $-d$ were employed. In such a case the said segments and branching wires would take the place as an equivalent of the distributing-rings and wires; but I prefer to use the distributing-rings, as thereby the crossing of the wires to the commutator-plates is avoided.

Upon reference to Figs. 3, 4, 5, and 6, the peculiarities in the construction of the commutator will be understood by the following description.

Upon the shaft $e$ there is a cylinder of insulating material $b^2$, into which radial saw-cuts are made and plates of vulcanized fiber $c^2$ are inserted. Between these, and upon the surfaces of the cylinder $b^2$, the metal commutator-plates 1 2 3 4, &c., are laid and fastened by screws $d^2$.

Into the ends of the cylinder $b^2$ and the plates $c^2$ annular grooves are turned, to receive the annular ribs upon the faces of the metal heads $e^2$ $e^3$, which are clamped by the nut $f^2$. This construction insures great strength and perfect insulation, and new commutator-plates may be substituted without inconvenience for any that may become worn out. The exterior surfaces of the commutator bars and plates $c^2$ are turned or ground off perfectly true, and the collectors $h^2\ k^2$ are applied at opposite sides of the commutator-cylinder. Each collector or rubber is composed of a number of plates with the ends curved to fit the curved surfaces of the commutator-bars. These plates are within the boxes $l^2$, that are supported by, but insulated from, the ring $m^2$. The boxes are open through and through in the direction of a radial plane to the shaft $e$, and each box is provided with a movable cover, $n^2$, a follower, $o^2$, a spring, $p^2$, and a set-screw, $q^2$, to press the plates $h^2\ k^2$ toward the commutators. The covers may be held on by pins 25, and $r^2$ are the binding-posts for the external currents. The rubbers ($h^2\ k^2$) are not as wide as the commutator-plates, and each rubber rests upon two of the commutator-plates during about two-thirds the time of movement of one of the plates across beneath the rubber, and upon one plate alone during about one-third of such time of movement, and this is while the current from that plate is at its maximum; hence the currents are not interrupted by the rubber passing from one plate upon the next; and I proportion the width of the rubbers to the commutator-plates, so that the current will be taken off nearly as long as it is flowing in one direction, for it is to be borne in mind that the polarity changes in these parts, that this change takes place in each plate ten times in one revolution, (with ten field-magnets,) and the induced current from each series of coils rises and falls in intensity. The position of the rubbers is such as to correspond with that where the maximum intensity is obtained, and it takes the current from one plate as the intensity is rising in that plate and releases contact with the previous plate, in which the current is lessening at the instant when the current from the two plates ceases to be in equipoise, thus equalizing to a considerable extent the currents taken off to the external circuits. These rubbers wear much longer than the ordinary brushes, the contact is much more perfect, and the commutator can be lubricated, and the oil remains between the metal plates of the rubbers.

In my former application filed February 25, 1882, and renewed February 27, 1883, the armature-coils are represented as connected in a closed circuit, and branch wires taken off to the respective rings and commutator-bars. This connection is also represented in the Frick German Patent No. 3,147, December 6, 1877. In my present armature-disk the free ends of the helices pass to the rings and terminate in the commutator-plates, as before described.

I claim as my invention—

1. The combination, in an armature-wheel, of two flat rings or disks with conical or tapered openings, ranges of coils or helices introduced into the openings, and screws or rivets for clamping the rings together and holding the helices into the disks, substantially as set forth.

2. The combination, in an armature-wheel, of two flat rings or disks having conical or tapered openings, and two separate ranges of coils introduced into the openings in such disks, substantially as set forth.

3. The combination, in an armature-wheel, of two flat rings or disks having openings, helices, or coils within such openings, and a layer of insulating material between the respective disks and their coils, substantially as set forth.

4. The combination, with the helices, of an armature wheel or ring of metal recessed to receive the coils or helices, and having separations in the metal between the alternate helices at 4, for the purposes and substantially as set forth.

5. The combination, with the armature-wheel, of helices or coils wound with an exterior conical form to fit into the similarly-shaped openings in the armature-wheel, substantially as set forth.

6. The combination, with the commutator-plates and intervening insulating material, forming a cylinder, of collectors or rubbers, each composed of a range of plates with concave ends fitting the surface of the commutator-cylinder, boxes for holding such plates, and springs to press upon the rubbers, substantially as set forth.

7. The combination, with the rubbers, of the boxes $l^2$ for holding the same, the springs $p^2$, the covers $n^2$ for the boxes, and the screws for adjusting the springs, substantially as set forth.

8. The combination, with the ranges of armature-coils, each having free ends, of the rings $+a\ +b\ -c\ -d$, the commutator-plates and collectors, and the circuit-connections, arranged substantially as set forth.

9. The combination, with the circular range of field-magnet poles, separate ranges of induction elements in the armature, and the commutator-plates and collectors, of the branched connections between the free ends of the armature elements and their respective commutator-plates, arranged substantially as and for the purposes set forth.

Signed by me this 19th day of May, A. D. 1883.

CLINTON M. BALL.

Witnesses:
JOHN F. BARTHEL, Jr.,
WM. SHAW.